Feb. 13, 1968 A. CSICSATKA 3,369,187

INTEGRATED ELECTRONIC CIRCUIT CONSTRUCTION INCLUDING EXTERNAL BIAS RESISTOR

Filed April 16, 1965

INVENTOR:
ANTAL CSICSATKA,

BY Norman C. Fulmer
HIS ATTORNEY.

3,369,187

INTEGRATED ELECTRONIC CIRCUIT CONSTRUCTION INCLUDING EXTERNAL BIAS RESISTOR

Antal Csicsatka, Utica, N.Y., assignor to General Electric Company, a corporation of New York Filed Apr. 16, 1965, Ser. No. 448,727
1 Claim. (Cl. 330—38)

ABSTRACT OF THE DISCLOSURE

An integrated electronic circuit construction including first and second transistors, an output electrode of the first transistor being DC coupled to an input electrode of the second transistor and the bias for the circuit being controlled by a discrete resistor positioned externally of the integrated circuit and directly connected between the collector and base electrodes of the first transistor.

This invention relates to electronic circuit construction, and more particularly to construction of electronic devices having so-called "integrated" or "micro" circuits.

Integrated circuits are complete circuits manufactured as an integral unit, usually of very small size, and may be manufactured in various ways such as by using thin-film techniques or by processing a slab of semiconductor material. Amplifiers, oscillators, mixers, detectors, and modulators are some examples of complete circuits that can be manufactured in integrated form. Two or more such circuits can be included together in an integrally manufactured unit. Transistors, diodes, resistors, and other circuit elements can be included in these integral units. After integrated circuits are manufactured, they are tested, and those falling outside acceptable test limits are discarded because it is not feasible to alter or repair them. This, of course, reduces the manufacturing yield of the integrated units.

An object of the invention is to provide an improved construction, including the method of construction, for electronic circuits.

Another object is to provide an improved construction for electronic devices employing integrated circuits.

A further object is to provide an improved construction arrangement for increasing the usable yield of manufactured integrated circuits.

Additional objects will be apparent from the following description of the invention and the claims, and from the accompanying drawing.

The circuit construction of the invention comprises, briefly and in a preferred embodiment, a substantially complete electronic circuit containing resistors and one or more biased devices (such as transistors), this circuit being manufactured as an integral unit except for a resistor which affects the bias on one or more of the biased devices. The integrated unit is provided with terminal means for connection to the integrated circuit of the aforesaid resistor, externally of the unit, of suitable resistance value for causing proper biasing of the biased devices for achieving desired functioning of the circuit. The method of this construction comprises manufacturing the integrated unit, determining the required resistance value, and connecting to the terminal means a resistor of the required resistance value for achieving desired operating characteristics of the circuit.

Figure 1:
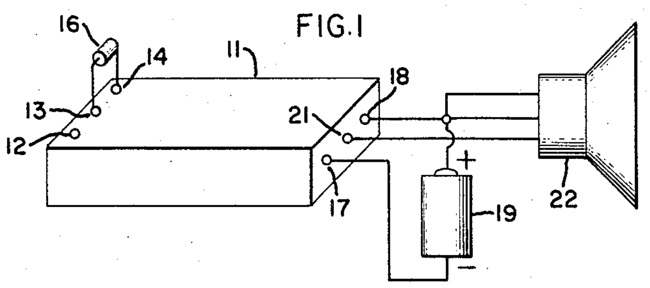
FIG. 1 is a pictorial view of a preferred embodiment of the invention, as applied to an audio amplifier.

Referring to FIG. 1, an integrated circuit unit 11 contains a circuit, such as an audio amplifier in the example to be described, which is a complete or substantially complete circuit with the exception of a resistor which is capable of affecting the bias voltage values on one or more biased devices in the circuit, such as transistors or diodes. Input signal terminals 12 and 13 are carried by the unit 11, and an additional terminal 14 is provided for connection thereto of an external resistor 16 for achieving proper bias adjustment of the integrated unit 11 as will be further described hereinafter. The resistor 16 is connected between the terminals 13 and 14, as shown. Voltage supply terminals 17 and 18 are provided on the unit 11, and a battery 19, for providing operating voltage for the unit 11, is connected between the terminals 17 and 18. An output signal terminal 21 is carried by the unit 11, and a loudspeaker 22 is connected between the terminals 18 and 21, as shown. The aforesaid terminals on the unit 11 may be solder terminals, or may comprise terminal wires extending from the unit 11.

Figure 2:
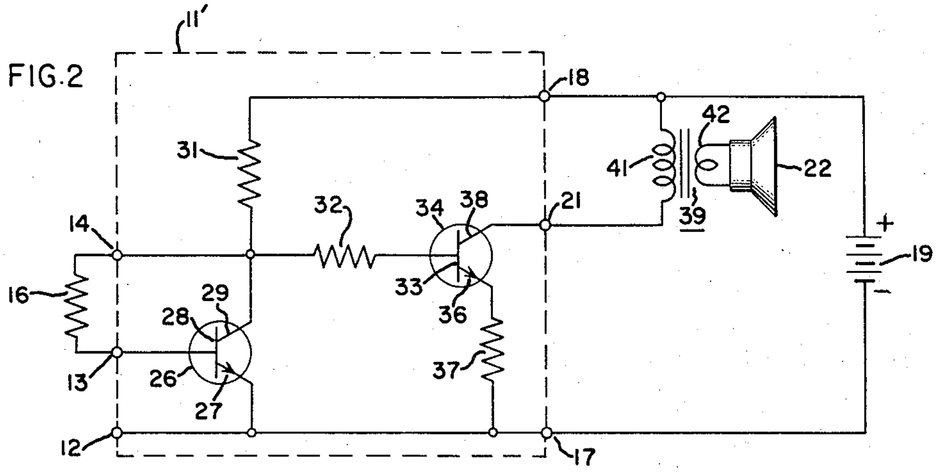
FIG. 2 is an electrical schematic diagram of the circuit of the apparatus of FIG. 1.

In FIG. 2, the portion of the circuit contained in the integrated manufactured unit 11, is enclosed by the dotted line 11'. A first amplifier transistor 26 has an emitter electrode 27 connected to the terminals 12 and 17, a base electrode 28 connected to the signal input terminal 13, and a collector electrode 29 connected via a load resistor 31 to the voltage terminal 18. The collector electrode 29 is connected to the terminal 14, and the resistor 16 is connected between the terminals 13 and 14 externally of the manufactured circuitry enclosed by the dashed line 11' such that the resistor 16 is electrically connected between the base electrode 28 and the collector electrode 29.

A resistor 32 is conncted between the collector electrode 29 of the first amplifier transistor 26 and the base electrode 33 of a second amplifier transistor 34. The emitter electrode 36 of this transistor is connected via a resistor 37 to the terminals 12 and 17, and the collector electrode 38 is connected to the signal output terminal 21. The loudspeaker 22 is connected between the terminals 18 and 21, via an output transformer 39 if required for proper impedance matching, the output transformer 39 comprising a primary winding 41 connected between the terminals 18 and 21, and a secondary winding 42 connected to the loudspeaker 22. The battery 19, being connected between the terminals 17 and 18, apply suitable operating voltage to the first and second transistors 26 and 34. The first and second transistors 26 and 34 amplify an input signal applied across the terminals 12 and 13, and the first amplifier transistor 26 additionally functions to provide a source of stabilized bias voltage for the second transistor 34. This is achieved by the circuitry shown, including the resistor 16 connected between the base and collector electrodes of the first transistor 26, so as to apply a component of the direct voltage at the collector thereof, to the base, in such a manner as to cause stabilization of the voltage at the collector 29 in spite of decreasing voltage of the battery 19 due to aging and depletion of the battery, as is more fully described and claimed in my co-pending patent application (Serial Number 448,691, filed April 16, 1965).

By constructing the amplifier with the voltage stabilization feedback resistor 16 connected externally of the amplifier unit 11, the usable yield of the manufactured amplifier units 11 is considerably increased. As is well known, manufactured devices such as the amplifier 11 vary in their characteristics, usually in a manner following the well-known probability curve, and only those manufactured units having characteristics falling within usable limits on this curve can be used, and those having characteristics falling above and below the usable limits, must be discarded since it is not feasible to repair integrated circuits.

The reason that the manufacturing process produces a certain number of integrated circuits having characteristics falling outside of usable limits, is due to inaccuracy in forming, and/or impurities in material used for, the transistors 26 and 34, and the various resistors manufactured in the unit 11.

In accordance with the method of my invention, the manufactured unit 11 is tested to determine its characteristics and to determine the value of resistor 16 which will cause proper performance, and then a resistor 16 of this suitable value is connected across the terminals 13 and 14, thereby resulting in a complete and usable unit. By this means, most of the manufactured integrated amplifiers 11 will be usable, and thus the invention increases the yield of the invention manufacturing process. An expeditious way of testing the unit 11 to determine the proper value for resistor 16, is to temporarily hold a resistor 16 of nominally correct value across the terminals 13 and 14, while measuring the circuit characteristics. If such resistance value is seen to be correct, a resistor of this value is connected across the terminals 13 and 14. If this resistance value is incorrect, an experienced operator or automated instruments can detect whether a higher or lower value of resistance is required, and then such required value of resistor is connected across the terminals 13 and 14 to complete the amplifier circuit.

By way of example, the values of components suitable for the circuit of FIG. 2 are as follows:

| | |
|---|---|
| Transistor **26** | GE Type 16A (silicon, beta 100). |
| Transistor **34** | GE Type 16B (silicon, beta 100). |
| Resistor **16** | 82,000 ohms. |
| Resistor **31** | 6,800 ohms. |
| Resistor **32** | 2,700 ohms. |
| Resistor **37** | 33 ohms. |
| Battery **36** | 9 volts. |

In accordance with the principles of the invention, any of the resistors of the circuit shown could be omitted from the manufactured unit, and terminal provisions made to attach this resistor externally of the unit 11 in order to increase the manufacturing yield as has been described. However, in accordance with the invention it is preferred to externally connect a relatively high resistance, thus saving the relatively high cost and difficulty of manufacturing high values of resistance in integrated circuit manufacturing. Thus, the resistor 16, which has the relatively high value of 82,000 ohms as compared to other resistors in the circuit, is externally connected in the preferred embodiment of the invention. It also is preferred that the amplifier be of the direct coupled type, whereby a single external resistor can affect biasing of both stages.

Figure 3:
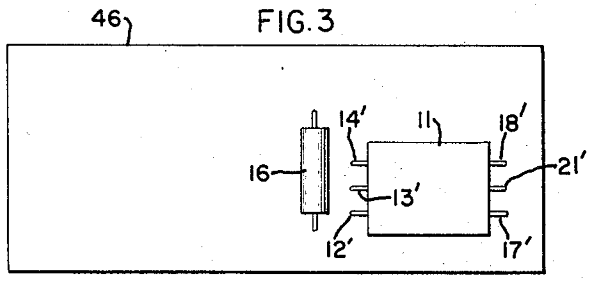
FIG. 3 is a top-plan view of the construction of an electronic device in accordance with an alternative preferred embodiment of the invention.
Figure 4:
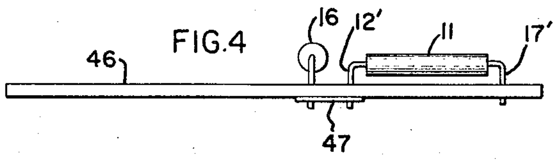
FIG. 4 is a side elevational view of the device of FIG. 3.

FIG. 3 shows the invention as applied to an electronic device, comprising a main circuit board 46 on which various components may be mounted such as a battery, mixer circuit, and intermediate frequency amplifier in the case of a complete radio receiver. The integrated audio amplifier 11 is provided with wire terminal leads 12', 13', etc. which are shaped so as to be inserted into suitable openings in the circuit board 46, whereupon these lead wires are soldered to plated circuits on the circuit board 46. Similarly the leads of the resistor 16 are inserted into suitable openings in a circuit board 46, and soldered to circuits 47 carried by the board for connecting the resistor 16 electrically to the lead wires 14' and 13' of the integrated unit 11. The resistor 16, and integrated amplifier unit 11, may be dip-soldered to the circuit board 46 simultaneously with other components carried by the board 46.

From the foregoing it will be understood that I have invented a new electronic circuit construction which achieves the desirable result of greater manufacturing yield of the manufactured integrated circuit units by providing for external connection to the units of a circuit resistor which may be given a suitable value, after the unit 11 is manufactured, so as to provide suitable biasing of the biased devices in the manufactured unit and thereby provide a usable unit even though the unit as manufactured might otherwise have characteristics falling outside of usable tolerances.

While preferred embodiments of the invention have been shown and described, various other embodiments and modifications thereof will be apparent to those skilled in the art and will fall within the scope of the invention as defined by the following claim.

What I claim is:

1. A construction for an amplifier circuit containing at least two transistors each having base emitter and collector electrodes, direct-current conductive means connecting an output electrode of a first one of said transistors to an input electrode of a second one of said transistors, and a resistor connected in said circuit directly between the base and collector electrodes of said first transistor, said construction comprising an integral unit containing said circuit except for said resistor, and a pair of terminals on said unit respectively connected to said base and collector electrodes for connecting said resistor electrically in said circuit when said resistor is connected across said terminal means externally of said unit.

References Cited

UNITED STATES PATENTS

| | | | |
|---|---|---|---|
| 3,107,331 | 10/1963 | Barditch et al. | 330—38 |
| 3,278,853 | 10/1966 | Lin | 330—38 |

FOREIGN PATENTS 840,952 10/1963 Great Britain.

OTHER REFERENCES

Bailey, "Black-Boxing Your Linear Integrated Circuit," Electronic Design, June 22, 1964, pp. 74–77.

Wood, "Gain Controlled Band-Pass Amplifiers," Electronic Engineering, April 1964, pp. 234–237.

ROY LAKE, *Primary Examiner.*

J. B. MULLINS, *Assistant Examiner.*